United States Patent
Nakahama et al.

(10) Patent No.: US 9,388,264 B2
(45) Date of Patent: Jul. 12, 2016

(54) METHOD FOR PRODUCING RESIN COMPOSITION AND RESIN COMPOSITION

(71) Applicant: CANON KABUSHIKI KAISHA, Tokyo (JP)

(72) Inventors: Kazumichi Nakahama, Tokyo (JP); Keiichiro Tsubaki, Tokyo (JP); Takayuki Hiratani, Tokyo (JP); Akira Kuriyama, Atsugi (JP); Taku Shimoda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 14/261,338

(22) Filed: Apr. 24, 2014

(65) Prior Publication Data

US 2014/0323673 A1 Oct. 30, 2014

(30) Foreign Application Priority Data

Apr. 26, 2013 (JP) .................................. 2013-093537

(51) Int. Cl.

| | |
|---|---|
| *C08F 220/12* | (2006.01) |
| *C08F 220/18* | (2006.01) |
| *C08F 218/02* | (2006.01) |
| *C08F 220/44* | (2006.01) |
| *C08F 212/08* | (2006.01) |
| *C08F 220/14* | (2006.01) |
| *C08F 218/12* | (2006.01) |

(52) U.S. Cl.
CPC ............. *C08F 220/44* (2013.01); *C08F 212/08* (2013.01); *C08F 218/12* (2013.01); *C08F 220/14* (2013.01)

(58) Field of Classification Search
CPC ..... C08F 220/12; C08F 220/18; C08F 218/02
USPC ............................ 526/330, 329.2, 329.5, 331
See application file for complete search history.

(56) References Cited

U.S. PATENT DOCUMENTS 5,391,450 A * 2/1995 Nagatsuka et al. ...... 430/124.33

FOREIGN PATENT DOCUMENTS

JP 2012-088580 A 5/2012

OTHER PUBLICATIONS

Marvel et al. Reactivity Ratios of Vinyl Esters of Aliphatic Acids and Some Common Vinyl Monomers. Journal of Polymer Science. vol. XXVII. pp. 39-58. 1958.*

*Primary Examiner* — Alexa Neckel
*Assistant Examiner* — Elizabeth Eng
(74) *Attorney, Agent, or Firm* — Canon U.S.A., Inc., IP Division (57) ABSTRACT

A method for producing a resin composition, comprising the step of: subjecting a radical copolymerization of a first radical polymerizable monomer which is free from any crystalline molecular chain and a second radical polymerizable monomer having a crystalline molecular chain, in the presence of a radical polymerization initiator,
wherein the second radical polymerizable monomer is the following compound, $$H_2C=C \begin{matrix} R_1 \\ | \\ O-\underset{\underset{O}{\|}}{C}-R_2 \end{matrix}$$

(wherein $R_1$ denotes a hydrogen atom or a methyl group, and $R_2$ denotes an alkyl group having at least 17 carbon atoms) the first radical polymerizable monomer has a particular reactivity ratio.

5 Claims, 2 Drawing Sheets

METHOD FOR PRODUCING RESIN COMPOSITION AND RESIN COMPOSITION

BACKGROUND OF THE INVENTION

1. Field of the Invention

The present invention relates to a method for producing a resin composition and a resin composition.

2. Description of the Related Art

Viscoelasticity is the property of materials that exhibit time-dependent strain upon the application of stress to the materials and return close to their original state with residual strain once the stress is removed. Viscoelastic resin compositions are used in various industrial sectors. Resin compositions suitable for resin binders for ink jet inks and electrophotography toners have a property of rapidly changing their viscoelasticity with an increase in temperature (hereinafter referred to as a "sharp melt property") so as to satisfy both storage stability and image forming capability.

Crystalline polymers, such as polymers of a radical polymerizable monomer having a crystalline molecular chain and polyesters having a crystalline main chain, have the sharp melt property. Because of their significant low-temperature brittleness, however, crystalline polymers are difficult to use alone. Low-temperature brittleness characteristic of crystalline polymers is ameliorated in resin compositions containing both a crystalline polymer and an amorphous polymer as described in Japanese Patent Laid-Open No. 2012-88580.

A method for producing a resin composition according to Japanese Patent Laid-Open No. 2012-88580 involves at least a crystalline polymer synthesis process, an amorphous polymer synthesis process, and a process of mixing the crystalline polymer with the amorphous polymer. Such many production processes are not preferred in terms of environmental load.

Thus, there is a demand for a method for producing a resin composition that has a sharp melt property and has toughness at room temperature in a single production process.

SUMMARY OF THE INVENTION

The present invention provides a method for producing a resin composition, comprising the step of: subjecting a radical copolymerization of a first radical polymerizable monomer which is free from any crystalline molecular chain, and a second radical polymerizable monomer having a crystalline molecular chain, in the presence of a radical polymerization initiator,
wherein the radical polymerizable monomer having a crystalline molecular chain is the following compound 1, (compound 1)

(wherein $R_1$ denotes a hydrogen atom or a methyl group, and $R_2$ denotes an alkyl group having at least 17 carbon atoms)
the first radical polymerizable monomer and the second radical polymerizable monomer are a combination of monomers such that a precipitate, which is obtained by a method shown below, has a phase separation structure,
the method comprising the steps of:

preparing a first homopolymer by polymerizing the first radical polymerizable monomer,
preparing a second homopolymer by polymerizing the second radical polymerizable monomer, dissolving the first homopolymer and the second homopolymer in a solvent and obtaining a solution of the homopolymers, and
adding the solution of the homopolymers to a common poor solvent and obtaining the precipitate,
the first radical polymerizable monomer has the following monomer reactivity ratio $r_1$, and the second radical polymerizable monomer has the following monomer reactivity ratio $r_2$, and
$r_1 > 1.0$
$r_2 < 1.0$
(wherein $r_1 = k_{11}/k_{12}$.
wherein $k_{11}$ denotes a reaction rate constant of an addition reaction in which the first radical polymerizable monomer binds to the first radical polymerizable monomer, and
$k_{12}$ denotes a reaction rate constant of an addition reaction in which the second radical polymerizable monomer binds to the first radical polymerizable monomer, and $r_2 = k_{22}/k_{21}$,
wherein $k_{22}$ denotes a reaction rate constant of an addition reaction in which the second radical polymerizable monomer binds to the second radical polymerizable monomer, and
$k_{21}$ denotes a reaction rate constant of an addition reaction in which the first radical polymerizable monomer binds to the second radical polymerizable monomer)
the ratio (B/(A+B)) of the second radical polymerizable monomer to the first radical polymerizable monomer is 0.25 or more and 0.80 or less in the copolymerization, wherein A denotes the amount of first radical polymerizable monomer (parts by mass), and B denotes the amount of second radical polymerizable monomer (parts by mass).

The present invention also provides a resin composition, comprising a first unit which is free from any crystalline molecular chain and a second unit having a crystalline molecular chain, wherein
the second unit is the following unit 1, (unit 1)

(wherein $R_1$ denotes a hydrogen atom or a methyl group, and $R_2$ denotes an alkyl group having at least 17 carbon atoms)
the ratio (D/(C+D)) of the second unit to the first unit is 0.25 or more and 0.80 or less in the resin composition, wherein C denotes the amount of first unit (parts by mass), and D denotes the amount of second unit (parts by mass), and
the resin composition has a sea-island type phase separation structure in which a main unit of a resin component forming the island phase is the first unit, and a main unit of a resin component forming the sea phase is the second unit.

Further features of the present invention will become apparent from the following description of exemplary embodiments with reference to the attached drawings.

DESCRIPTION OF THE EMBODIMENTS

The present invention will be described in detail below.

The present invention provides a method for producing a resin composition, comprising the step of: subjecting a radical copolymerization of a first radical polymerizable monomer and a second radical polymerizable monomer, in the presence of a radical polymerization initiator. A crystalline molecular chain in the present invention is a crystalline side chain and is a side chain bonded to a main chain in a resin composition formed by a radical copolymerization.

Hereafter, "the radical polymerizable monomer which is free from any crystalline molecular chain" may be referred to as "the first radical polymerizable monomer", and "the radical polymerizable monomer having a crystalline molecular chain" may be referred to as "the second radical polymerizable monomer".

In accordance with the present invention, a resin composition that has a sharp melt property and has toughness at room temperature can be produced in a single production process.

In a production method according to the present invention, the first radical polymerizable monomer and the second radical polymerizable monomer have the following monomer reactivity ratios.

$r_1 > 1.0$
$r_2 < 1.0$

The monomer reactivity ratios will be described below.

Figure 2:
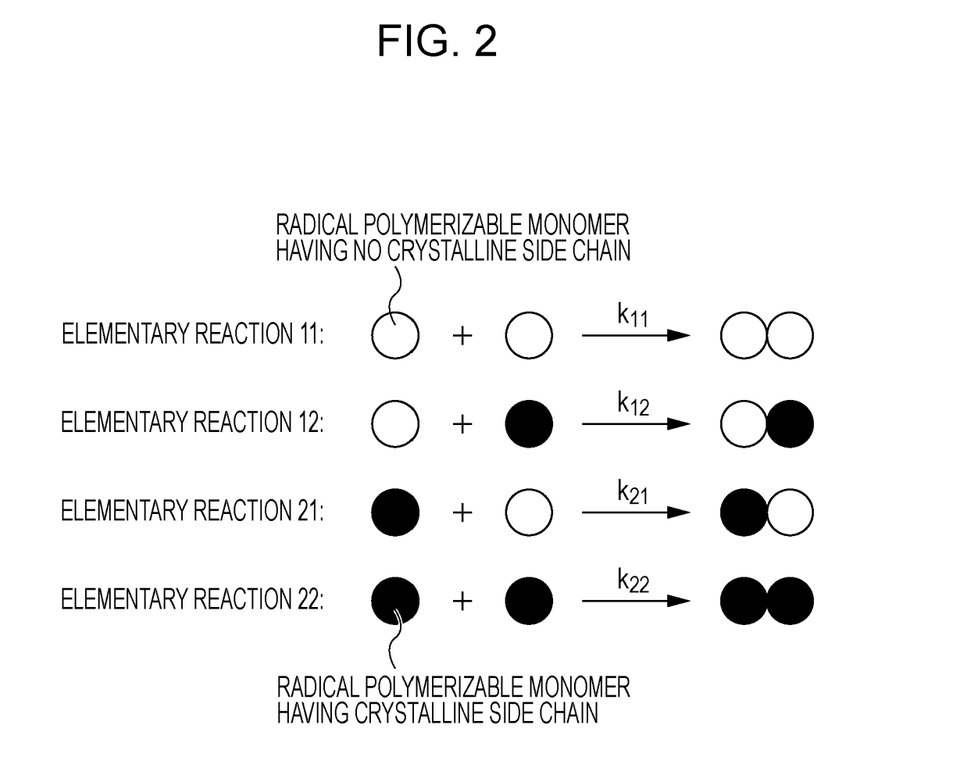
FIG. 2 is an explanatory view of elementary reactions in a radical copolymerization reaction of a radical polymerizable monomer which is free from any crystalline molecular chain and a radical polymerizable monomer having a crystalline molecular chain.

A radical copolymerization of the first radical polymerizable monomer and the second radical polymerizable monomer includes the following four elementary reactions (see FIG. 2).

(1) Elementary reaction 11: The first radical polymerizable monomer binds to the first radical polymerizable monomer.

(2) Elementary reaction 12: The second radical polymerizable monomer binds to the first radical polymerizable monomer.

(3) Elementary reaction 22: The second radical polymerizable monomer binds to the second radical polymerizable monomer.

(4) Elementary reaction 21: The first radical polymerizable monomer binds to the second radical polymerizable monomer.

The monomer reactivity ratio $r_1$ is expressed by the following equation, wherein $k_{11}$ denotes the reaction rate constant of the elementary reaction 11, and $k_{12}$ denotes the reaction rate constant of the elementary reaction 12.

$r_1 = k_{11}/k_{12}$

The monomer reactivity ratio $r_2$ is expressed by the following equation, wherein $k_{22}$ denotes the reaction rate constant of the elementary reaction 22, and $k_{21}$ denotes the reaction rate constant of the elementary reaction 21.

$r_2 = k_{22}/k_{21}$

A radical copolymerization of the first radical polymerizable monomer and the second radical polymerizable monomer having monomer reactivity ratios $r_1$ and $r_2$ that satisfy the formulae described above yields a resin composition containing the following copolymers:

(1) a copolymer 1 rich in a first unit of a radical polymerizable monomer which is free from any crystalline molecular chain; and (2) a copolymer 2 rich in a second unit of a radical polymerizable monomer having a crystalline molecular chain.

The present inventors found in an experiment that a resin composition containing the copolymer 1 and the copolymer 2 has a sharp melt property and toughness at room temperature.

On the other hand, a combination of the first radical polymerizable monomer and the second radical polymerizable monomer that do not satisfy the formulae described above results in a random copolymer of a monomer which is free from any crystalline molecular chain and a monomer having a crystalline molecular chain. A resin composition containing such a random copolymer does not have a sharp melt property or does not have a sharp melt property at an intended temperature. This is probably because such a random copolymer of a monomer which is free from any crystalline molecular chain and a monomer having a crystalline molecular chain has a great distance between the crystalline molecular chains, which become side chains of the copolymer, and this inhibits or reduces crystallization.

The monomer reactivity ratios of radical polymerizable monomers are generally found in Polymer Handbook Third Edition (Wiley), II/153-II/266. The monomer reactivity ratios can also be determined using a conventional method, such as a curve fitting method, an intersection point method, a Fineman-Ross method, or a Kelen-Tudos method.

The radical polymerizable monomer having a crystalline molecular chain and the unit having a crystalline molecular chain according to an embodiment of the present invention will be described below.

The radical polymerizable monomer having a crystalline molecular chain according to an embodiment of the present invention is a crystalline vinyl carboxylate having the following formula (compound 1).

(compound 1)

(wherein $R_1$ denotes a hydrogen atom or a methyl group, and $R_2$ denotes an alkyl group having at least 17 carbon atoms)

A resin composition according to an embodiment of the present invention contains the compound 1 in the form of the following unit 1.

(unit 1)

(wherein $R_1$ denotes a hydrogen atom or a methyl group, and $R_2$ denotes an alkyl group having at least 17 carbon atoms)

Polymers of a crystalline vinyl carboxylate have a melting point and have a sharp melt property based on a melting phenomenon at the melting point.

The melting point of a polymer of a crystalline vinyl carboxylate depends on the molecular weight of a crystalline molecular chain of the polymer. This means that the temperature at which a resin composition exhibits its sharp melt property depends on the molecular weight of a crystalline molecular chain. The present inventors found that when the number of carbon atoms of $R_2$ in the compound 1 and the unit 1 is 17 or more (a molecular weight of 239 or more), the vinyl carboxylate polymer has an appropriate melting point, and the resin composition exhibits a sharp melt property at an appropriate temperature. $R_2$ of the compound 1 and the unit 1 composed of a linear alkyl group exhibits higher crystal growth than $R_2$ composed of a branched alkyl group. The crystalline vinyl carboxylate may be used alone or in combination.

The first radical polymerizable monomer and the first unit which is free from any crystalline molecular chain will be described below. A first radical polymerizable monomer is synonymous with an amorphous radical polymerizable monomer. Any radical polymerizable monomer which is free from any crystalline molecular chain that has a reactivity ratio that satisfies the formula described above may be used. For example, the first radical polymerizable monomer is styrene, an amorphous styrene derivative, an amorphous acrylate, an amorphous methacrylate, or an amorphous acrylonitrile. A plurality of radical polymerizable monomer which is free from any crystalline molecular chains may be used in combination. A unit which is free from any crystalline molecular chain according to an embodiment of the present invention is a unit that constitutes a polymer of the corresponding radical polymerizable monomer which is free from any crystalline molecular chain.

In accordance with an embodiment of the present invention, the first radical polymerizable monomer and the second radical polymerizable monomer are a combination of monomers such that a precipitate, which is obtained by a method shown below, has a phase separation structure, the method comprising the steps of:

preparing a first homopolymer by polymerizing the first radical polymerizable monomer, preparing a second homopolymer by polymerizing the second radical polymerizable monomer, dissolving the first homopolymer and the second homopolymer in a solvent and obtaining a solution of the homopolymers, and adding the solution of the homopolymers to a common poor solvent and obtaining the precipitate.

As described above, a resin composition according to an embodiment of the present invention contains a copolymer 1 rich in a homopolymer of a radical polymerizable monomer which is free from any crystalline molecular chain and a copolymer 2 rich in a homopolymer of a radical polymerizable monomer having a crystalline molecular chain. Thus, the copolymer 1 and the homopolymer of the first radical polymerizable monomer have very similar thermodynamic properties. The copolymer 2 and the homopolymer of the second radical polymerizable monomer also have very similar thermodynamic properties. Thus, the phase separation between a homopolymer of the first radical polymerizable monomer and a homopolymer of the second radical polymerizable monomer implies phase separation between the copolymer 1 and the copolymer 2.

A phase separation structure of a homopolymer of the first radical polymerizable monomer (hereinafter referred to as a first homopolymer) and a homopolymer of a radical polymerizable monomer having a crystalline molecular chain (hereinafter referred to as a second homopolymer) can be examined as described below.

The phase separation can be examined by drying the resulting precipitate, and observing the inner structure of the resulting resin composition.

In the case that the first homopolymer and the second homopolymer are incompatible with each other and undergo phase separation, the inner structure includes a phase separation structure associated with a spinodal phase separation phenomenon or a nucleation-nuclear growth phase separation phenomenon. In the case that the first homopolymer and the second homopolymer are compatible with each other, no clear phase separation structure is observed in the inner structure. Examples of the phase separation structure include a sea-island structure, a cylinder structure, a lamellar structure, and a bicontinuous structure. A resin composition according to an embodiment of the present invention may contain copolymers that form a sea-island type phase separation structure. When the main unit of a resin component forming the island phase is a unit which is free from any crystalline molecular chain, and the main unit of a resin component forming the sea phase is a unit having a crystalline molecular chain, the resin composition can have a sharp melt property.

The inner structure of a viscoelastic composition can be examined by observing a cross section of the viscoelastic composition using a conventional method, for example, with a transmission electron microscope or a scanning probe microscope.

In accordance with an embodiment of the present invention, the ratio (B/(A+B)) of the second radical polymerizable monomer to the first radical polymerizable monomer is 0.25 or more and 0.80 or less in the copolymerization, wherein A denotes the amount of first radical polymerizable monomer (parts by mass), and B denotes the amount of second radical polymerizable monomer (parts by mass).

A ratio (B/(A+B)) of less than 0.25 results in a polymerization composition having an insufficient sharp melt property. A ratio (B/(A+B)) of more than 0.80 results in marked brittleness at room temperature.

In accordance with an embodiment of the present invention, the ratio (B/(A+B)) may be 0.30 or more and 0.60 or less.

The present inventors found in an experiment that a ratio (B/(A+B)) of 0.30 or more results in a stable excellent sharp melt property independent of the mass of a unit having a crystalline molecular chain contained in the resin composition. The present inventors also found in an experiment that a ratio (B/(A+B)) of 0.60 or less results in particularly good toughness at room temperature.

When the first radical polymerizable monomer and the second radical polymerizable monomer that satisfy the ratio (B/(A+B)) described above are used, the ratio (D/(C+D)) of the unit having a crystalline molecular chain to the unit which is free from any crystalline molecular chain in the resulting resin composition is 0.25 or more and 0.80 or less, wherein C denotes the amount of unit which is free from any crystalline molecular chain (parts by mass), and D denotes the amount of unit having a crystalline molecular chain (parts by mass).

The ratio (D/(C+D)) may be 0.30 or more and 0.60 or less.

A conventionally known radical polymerization initiator may be used in the polymerization of the first radical polymerizable monomer and the second radical polymerizable monomer. Examples of the radical polymerization initiator include azo polymerization initiators, such as 2,2'-azobisisobutyronitrile, 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), and 2,2'-azobis-(2,4-dimethylvaleronitrile), and organic peroxide polymerization initiators, such as dibenzoyl peroxide, cumene hydroperoxide, di-2-ethylhexyl peroxydicarbonate, di-sec-butyl peroxydicarbonate, acetyl peroxide, and peresters (for example, t-butyl peroctoate, α-cumyl peroxypivalate, and t-butyl peroctoate). Acetophenone or ketal photo radical polymerization initiators may also be used. These radical polymerization initiators may be used alone or in combination. In the case that two or more radical polymerization initiators are used, use of radical polymerization initiators having different 10-hour half-life temperatures that differ by 10° C. or more tends to increase the polymerization conversion of a radical copolymerization.

A radical copolymerization according to an embodiment of the present invention may be induced using a general method for inducing a radical polymerization, such as heating, photoirradiation, or the addition of a reducing agent. Heating has good workability or chemical reaction controllability. When radical growth is induced by heating, the heating temperature is preferably greater than or equal to the 10-hour half-life temperature of at least one radical polymerization initiator and less than or equal to the 10-hour half-life temperature+30° C. More preferably, the heating temperature is greater than or equal to the 10-hour half-life temperature and less than or equal to the 10-hour half-life temperature+20° C. The heating temperature in a polymerization process according to an embodiment of the present invention may be increased or decreased. A radical copolymerization may be performed after a polymerizable monomer composition containing a radical polymerizable monomer which is free from any crystalline molecular chain, a radical polymerizable monomer having a crystalline molecular chain, and a radical polymerization initiator is prepared. A radical polymerization initiator may be further added to the reaction system during the radical copolymerization.

Figure 1:
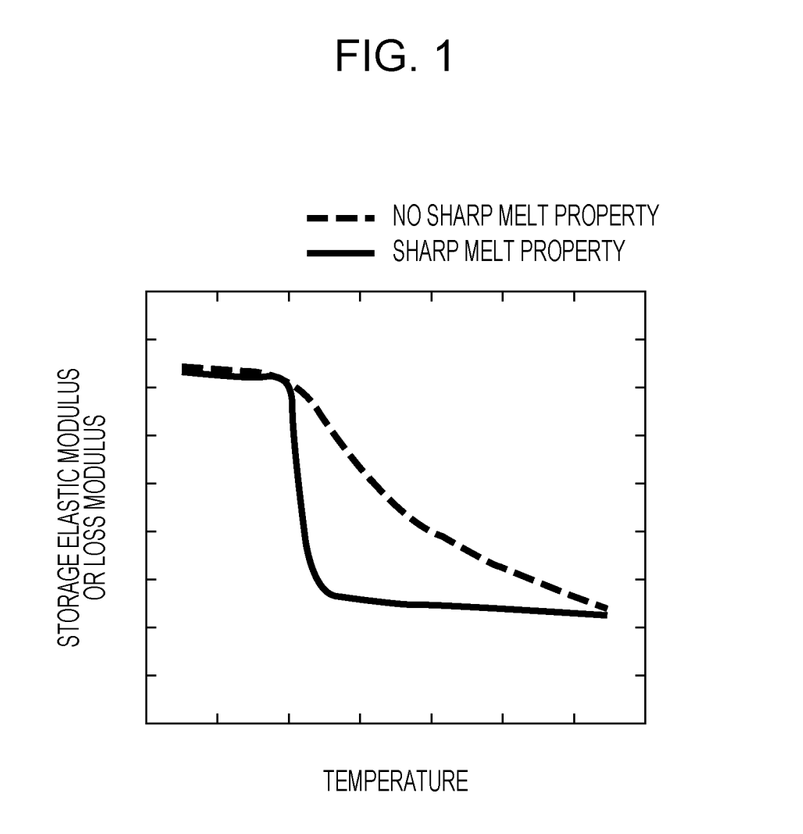
FIG. 1 is an explanatory view of the sharp melt property in the present invention.

The term "sharp melt property", as used herein, means that the storage elastic modulus or loss modulus changes rapidly with temperature, as illustrated in FIG. 1. The viscoelasticity of a resin composition may be measured using a conventional method, such as with a rheometer.

EXAMPLES

A resin composition and a method for producing the resin composition according to the present invention will be further described in the following examples. The present invention is not limited to these examples.

(Measurement of Resin Viscoelasticity)

A resin composition was pelletized at 4 MPa. The loss modulus of the pellets was measured as a function of temperature with a rheometer AR 2000ex (manufactured by TA Instruments).

The temperature at which a homopolymer of a radical polymerizable monomer having a crystalline molecular chain exhibits its sharp melt property was taken as a reference temperature. In the case that the variation width of loss modulus between the reference temperature+5° C. and the reference temperature−5° C. was $10^7$ Pa or more, the sample was judged to have a sharp melt property.

(Method for Observing Phase Separation Structure)

A resin composition was pelletized at 2 MPa. The pellets were fractured in liquid nitrogen and were stained with ruthenium tetroxide vapor. A backscattered electron image of a resin composition cross section was observed with a scanning electron microscope.

(Evaluation of Brittleness)

Brittleness was evaluated by comparing friability between a homopolymer of a crystalline vinyl carboxylate and a resin composition synthesized using the crystalline vinyl carboxylate as a radical polymerizable monomer.

More specifically, the homopolymer and the resin composition were pelletized at 4 MPa. The friability of pellets was compared for the homopolymer and the resin composition by crushing the pellets with fingers at room temperature. A resin composition having substantially the same friability as the homopolymer was rated as being poor. A resin composition less friable than the homopolymer was rated as being fair. A resin composition much less friable than the homopolymer was rated as being good.

Synthesis Example 1 of Vinyl Carboxylate Homopolymer 1.0 g of ethenyl docosanoate and 0.8 g of toluene were weighed in a 20-mL glass vessel. The glass vessel equipped with a serum cap and a nitrogen inlet was placed in a thermostat at 80° C., and nitrogen bubbling was continued for 10 minutes. 0.034 g of V-601 dissolved in 0.2 g of toluene was then injected into the glass vessel to initiate radical polymerization. After six hours, the contents of the glass vessel were poured into a large amount of ethanol, and an ethenyl docosanoate polymer was collected as a precipitate. The precipitate was dried and was crushed with fingers. The dried precipitate was easily crushed with fingers. Thus, the ethenyl docosanoate homopolymer was judged to be brittle at room temperature. Docosanoic acid ethenyl ester is a crystalline vinyl carboxylate corresponding to the compound 1 in which $R_1$ is hydrogen and $R_2$ is a linear alkyl group having 21 carbon atoms (molecular weight 295).

Synthesis Example 2 of Vinyl Carboxylate Homopolymer

A vinyl stearate polymer was produced in the same manner as in "Synthesis Example 1 of Vinyl Carboxylate Homopolymer" except that ethenyl docosanoate was replaced with vinyl stearate. The vinyl stearate polymer had substantially the same brittleness as the ethenyl docosanoate polymer. Vinyl stearate is a crystalline vinyl carboxylate corresponding to the compound 1 in which $R_1$ is hydrogen and $R_2$ is a linear alkyl group having 17 carbon atoms (molecular weight 239).

Synthesis Example 3 of Vinyl Carboxylate Homopolymer

A vinyl palmitate polymer was produced in the same manner as in "Synthesis Example 1 of Vinyl Carboxylate Homopolymer" except that ethenyl docosanoate was replaced with vinyl palmitate, and 0.25 g of V-601 was weighed. The vinyl palmitate polymer had substantially the same brittleness as the ethenyl docosanoate polymer. Vinyl palmitate is a crystalline vinyl carboxylate corresponding to the compound 1 in which $R_1$ is hydrogen and $R_2$ is a linear alkyl group having 15 carbon atoms (molecular weight 211).

(Synthesis Example of Homopolymer of Radical Polymerizable Monomer Having Crystalline Molecular Chain Other than Vinyl Carboxylates)

A behenyl acrylate polymer was produced in the same manner as in "Synthesis Example 1 of Vinyl Carboxylate Homopolymer" except that ethenyl docosanoate was replaced with behenyl acrylate. The behenyl acrylate polymer had substantially the same brittleness as the ethenyl docosanoate polymer. Behenyl acrylate has the structure of the following compound 3.

compound 3

Example 1

10.0 g of styrene and ethenyl docosanoate in total were weighed in a 20-mL glass vessel. The glass vessel equipped with a serum cap and a nitrogen inlet was placed in a thermostat at 80° C., and nitrogen bubbling was continued for 10 minutes. 0.4 g of V-601 dissolved in 0.4 g of toluene was then injected into the glass vessel to initiate radical copolymerization. After five hours, 0.2 g of V-601 dissolved in 0.2 g of toluene was injected into the glass vessel, and the radical copolymerization was continued. After one hour, a solid body in the glass vessel was dried under vacuum to yield a viscoelastic resin composition. Styrene and ethenyl docosanoate have monomer reactivity ratios $r_1$ of 15 and $r_2$ of 0.01.

Resin composition codes 1 to 11 were produced by using the following masses of styrene and ethenyl docosanoate in the polymerization procedures described above.

Code 1:
A resin composition produced using 9.0 g of styrene and 1.0 g of ethenyl docosanoate (the ratio of radical polymerizable monomer having a crystalline molecular chain: 0.10)
Code 2:
A resin composition produced using 8.0 g of styrene and 2.0 g of ethenyl docosanoate (the ratio of radical polymerizable monomer having a crystalline molecular chain: 0.20)
Code 3:
A resin composition produced using 7.5 g of styrene and 2.5 g of ethenyl docosanoate (the ratio of radical polymerizable monomer having a crystalline molecular chain: 0.25)
Code 4:
A resin composition produced using 7.0 g of styrene and 3.0 g of ethenyl docosanoate (the ratio of radical polymerizable monomer having a crystalline molecular chain: 0.30)
Code 5:
A resin composition produced using 6.0 g of styrene and 4.0 g of ethenyl docosanoate (the ratio of radical polymerizable monomer having a crystalline molecular chain: 0.40)
Code 6:
A resin composition produced using 5.0 g of styrene and 5.0 g of ethenyl docosanoate (the ratio of radical polymerizable monomer having a crystalline molecular chain: 0.50)
Code 7:
A resin composition produced using 4.0 g of styrene and 6.0 g of ethenyl docosanoate (the ratio of radical polymerizable monomer having a crystalline molecular chain: 0.60)
Code 8:
A resin composition produced using 3.0 g of styrene and 7.0 g of ethenyl docosanoate (the ratio of radical polymerizable monomer having a crystalline molecular chain: 0.70)
Code 9:
A resin composition produced using 2.0 g of styrene and 8.0 g of ethenyl docosanoate (the ratio of radical polymerizable monomer having a crystalline molecular chain: 0.80)
Code 10:
A resin composition produced using 1.5 g of styrene and 8.5 g of ethenyl docosanoate (the ratio of radical polymerizable monomer having a crystalline molecular chain: 0.85)
Code 11:
A resin composition produced using 1.0 g of styrene and 9.0 g of ethenyl docosanoate (the ratio of radical polymerizable monomer having a crystalline molecular chain: 0.90)

Table shows the mass fraction of a unit derived from ethenyl docosanoate in the resulting resin composition calculated from $^1$H-NMR measurements.

Table also shows the evaluation results for a phase separation structure and brittleness at room temperature.

Viscoelasticity was compared between the resulting resin composition and the ethenyl docosanoate homopolymer with respect to the temperature dependence of loss modulus. In the present example, the temperature (60° C.) at which the ethenyl docosanoate homopolymer exhibits its sharp melt property was taken as a reference temperature. The sharp melt property of the resulting resin composition was evaluated from the variation width of loss modulus between 55° C. and 65° C. The results are summarized in Table.

A phase separation structure of a styrene polymer and the ethenyl docosanoate homopolymer was examined as described below.

A styrene polymer and the ethenyl docosanoate homopolymer produced in the synthesis example 1 were dissolved in chloroform. Developing this solution with a large amount of methanol formed a precipitate. After the precipitate was dried under vacuum, the inner structure of the precipitate was examined. The precipitate had a phase separation structure of the styrene polymer and the ethenyl docosanoate polymer.

The styrene polymer was produced using the following procedures. 1.0 g of styrene and 10.0 g of toluene were weighed in a 20-mL glass vessel. The glass vessel equipped with a serum cap and a nitrogen inlet was placed in a thermostat at 80° C., and nitrogen bubbling was continued for 10 minutes. 0.04 g of V-601 dissolved in 0.2 g of toluene was then injected into the glass vessel to initiate radical polymerization. After six hours, the contents of the glass vessel were poured into a large amount of methanol, and a styrene polymer was collected as a precipitate.

The resin composition codes 3 to 9 had a sea-island type phase separation structure in which the main unit of a resin component forming the island phase was a unit derived from styrene, and the main unit of a resin component forming the sea phase was a unit derived from ethenyl docosanoate.

TABLE

| Code | Mass fraction of unit derived from ethenyl docosanoate (mass %) | Phase separation structure | Brittleness | Difference in loss modulus (Pa) |
|---|---|---|---|---|
| Code 1 | 9.7 | Not observed | good | $8.20 \times 10^5$ |
| Code 2 | 19.2 | Not observed | good | $9.88 \times 10^5$ |
| Code 3 | 26.1 | Observed *1) | good | $9.15 \times 10^7$ |
| Code 4 | 29.2 | Observed *1) | good | $1.59 \times 10^7$ |
| Code 5 | 41.2 | Observed *1) | good | $1.47 \times 10^7$ |
| Code 6 | 50.5 | Observed *1) | good | $1.61 \times 10^7$ |
| Code 7 | 59.2 | Observed *1) | good | $1.59 \times 10^7$ |
| Code 8 | 68.7 | Observed *1) | fair | $1.62 \times 10^7$ |
| Code 9 | 79.7 | Observed *1) | fair | $1.67 \times 10^7$ |
| Code 10 | 83.2 | Not observed | poor | $1.72 \times 10^7$ |
| Code 11 | 87.2 | Not observed | poor | $1.81 \times 10^7$ |

*1) A sea-island type phase separation structure in which the main component of the island phase was a unit derived from styrene, and the main component of the sea phase was a unit derived from ethenyl docosanoate.

Example 2

6.0 g of methyl methacrylate and 4.0 g of ethenyl docosanoate were weighed in a 20-mL glass vessel. The glass vessel equipped with a serum cap and a nitrogen inlet was placed in a thermostat at 80° C., and nitrogen bubbling was continued for 10 minutes. 0.4 g of V-601 dissolved in 0.4 g of toluene was then injected into the glass vessel to initiate radical copolymerization. After five hours, 0.2 g of V-601 dissolved in 0.2 g of toluene was injected into the glass vessel, and the radical copolymerization was continued. After one hour, a solid body in the glass vessel was dried under vacuum to yield a resin composition code 12.

The mass fraction of a unit derived from ethenyl docosanoate in the code 12 was 38.6 mass % when calculated from $^1$H-NMR measurements.

The inner structure of the code 12 was examined. The code 12 had a sea-island type phase separation structure in which the main unit of a resin component forming the island phase was a unit derived from methyl methacrylate, and the main unit of a resin component forming the sea phase was a unit derived from ethenyl docosanoate.

In the evaluation of brittleness, the code 12 was rated good. In the evaluation of resin viscoelasticity, the code 12 had substantially the same sharp melt property as the code 5.

Methyl methacrylate and ethenyl docosanoate have monomer reactivity ratios $r_1$ of 5.5 and $r_2$ of 0.05.

A phase separation structure of a methyl methacrylate polymer and the ethenyl docosanoate homopolymer was examined as described below.

A methyl methacrylate polymer and the ethenyl docosanoate homopolymer produced in the synthesis example 1 were dissolved in chloroform. Developing this solution with a large amount of methanol formed a precipitate. After the precipitate was dried under vacuum, the inner structure of the precipitate was examined. The precipitate had a sea-island type phase separation structure in which the main unit of a resin component forming the island phase was a unit derived from methyl methacrylate, and the main unit of a resin component forming the sea phase was a unit derived from ethenyl docosanoate.

The methyl methacrylate polymer was produced using the following procedures. 1.0 g of methyl methacrylate and 10.0 g of toluene were weighed in a 20-mL glass vessel. The glass vessel equipped with a serum cap and a nitrogen inlet was placed in a thermostat at 80° C., and nitrogen bubbling was continued for 10 minutes. 0.04 g of V-601 dissolved in 0.2 g of toluene was then injected into the glass vessel to initiate radical polymerization. After six hours, the contents of the glass vessel were poured into a large amount of methanol, and a methyl methacrylate polymer was collected as a precipitate.

Example 3

6.0 g of acrylonitrile and 4.0 g of ethenyl docosanoate were weighed in a 20-mL glass vessel. The glass vessel equipped with a serum cap and a nitrogen inlet was placed in a thermostat at 80° C., and nitrogen bubbling was continued for 10 minutes. 0.4 g of V-601 dissolved in 0.4 g of toluene was then injected into the glass vessel to initiate radical copolymerization. After five hours, 0.2 g of V-601 dissolved in 0.2 g of toluene was injected into the glass vessel, and the radical copolymerization was continued. After one hour, a solid body in the glass vessel was dried under vacuum to yield a resin composition code 13.

The mass fraction of a unit derived from ethenyl docosanoate in the code 13 was 36.9 mass % when calculated from $^1$H-NMR measurements.

The inner structure of the code 13 was examined. The code 13 had a sea-island type phase separation structure in which the main unit of a resin component forming the island phase was a unit derived from acrylonitrile, and the main unit of a resin component forming the sea phase was a unit derived from ethenyl docosanoate.

In the evaluation of brittleness, the code 13 was rated good. In the evaluation of resin viscoelasticity, the code 13 had substantially the same sharp melt property as the code 5.

Acrylonitrile and ethenyl docosanoate have monomer reactivity ratios $r_1$ of 4.5 and $r_2$ of 0.1.

A phase separation structure of an acrylonitrile polymer and the ethenyl docosanoate homopolymer was examined as described below.

An acrylonitrile polymer and the ethenyl docosanoate homopolymer produced in the synthesis example 1 were dissolved in chloroform. Developing this solution with a large amount of methanol formed a precipitate. After the precipitate was dried under vacuum, the inner structure of the precipitate was examined. The precipitate had a sea-island type phase separation structure in which the main unit of a resin component forming the island phase was a unit derived from acrylonitrile, and the main unit of a resin component forming the sea phase was a unit derived from ethenyl docosanoate.

The acrylonitrile polymer was produced using the following procedures. 1.0 g of acrylonitrile and 10.0 g of toluene were weighed in a 20-mL glass vessel. The glass vessel equipped with a serum cap and a nitrogen inlet was placed in a thermostat at 80° C., and nitrogen bubbling was continued for 10 minutes. 0.04 g of V-601 dissolved in 0.2 g of toluene was then injected into the glass vessel to initiate radical polymerization. After six hours, the contents of the glass vessel were poured into a large amount of methanol, and an acrylonitrile polymer was collected as a precipitate.

Example 4

6 g of styrene and 4 g of vinyl stearate described in the synthesis example 2 were weighed in a 20-mL glass vessel. The glass vessel equipped with a serum cap and a nitrogen inlet was placed in a thermostat at 70° C., and nitrogen bubbling was continued for 10 minutes. 0.4 g of V-65 and 0.4 g of V-601 dissolved in 0.8 g of toluene were then injected into the glass vessel to initiate radical copolymerization. After five hours, the set temperature of the thermostat was increased to 80° C., and the radical copolymerization was continued. After two hours, a solid body in the glass vessel was dried under vacuum to yield a resin composition code 14.

The mass fraction of a unit derived from vinyl stearate in the code 14 was 40.2 mass % when calculated from $^1$H-NMR measurements.

The inner structure of the code 14 was examined. The code 14 had a sea-island type phase separation structure in which the main unit of a resin component forming the island phase was a unit derived from styrene, and the main unit of a resin component forming the sea phase was a unit derived from vinyl stearate.

In the evaluation of brittleness, the code 14 was rated good. In the evaluation of the resin viscoelasticity of the code 14 and the vinyl stearate polymer, the temperature dependence of loss modulus was compared. The code 14 had substantially the same sharp melt property as the vinyl stearate polymer. The starting temperature of the sharp melt of the code 14 and the temperature at which the vinyl stearate polymer exhibited the sharp melt property were 48° C.

Styrene and vinyl stearate have monomer reactivity ratios $r_1$ of 15 and $r_2$ of 0.01.

A phase separation structure of a styrene polymer and the vinyl stearate homopolymer was examined as described below.

A styrene polymer and the vinyl stearate homopolymer produced in the synthesis example 2 were dissolved in chloroform. Developing this solution with a large amount of methanol formed a precipitate. After the precipitate was dried under vacuum, the inner structure of the precipitate was examined. The precipitate had a sea-island type phase separation structure in which the main unit of a resin component forming the island phase was a unit derived from styrene, and the main unit of a resin component forming the sea phase was a unit derived from vinyl stearate.

The styrene polymer was produced using the following procedures. 1.0 g of styrene and 10.0 g of toluene were weighed in a 20-mL glass vessel. The glass vessel equipped with a serum cap and a nitrogen inlet was placed in a thermostat at 80° C., and nitrogen bubbling was continued for 10 minutes. 0.04 g of V-601 dissolved in 0.2 g of toluene was then injected into the glass vessel to initiate radical polymerization. After six hours, the contents of the glass vessel were poured into a large amount of methanol, and a styrene polymer was collected as a precipitate.

Comparative Example 1

6.0 g of styrene and 4.0 g of vinyl palmitate described in the synthesis example 3 were weighed in a 20-mL glass vessel. The glass vessel equipped with a serum cap and a nitrogen inlet was placed in a thermostat at 80° C., and nitrogen bubbling was continued for 10 minutes. 1.0 g of V-601 dissolved in 0.8 g of toluene was then injected into the glass vessel to initiate radical copolymerization. After five hours, 1.0 g of V-601 dissolved in 0.8 g of toluene was injected into the glass vessel, and the radical copolymerization was continued. After one hour, a solid body in the glass vessel was dried under vacuum to yield a resin composition ref 1.

The mass fraction of a unit derived from vinyl palmitate in the ref 1 was 39.7 mass % when calculated from $^1$H-NMR measurements.

The inner structure of the ref 1 was examined. No phase separation structure was observed. In the evaluation of brittleness, the ref 1 was rated good. In the evaluation of the resin viscoelasticity of the ref 1 and the vinyl palmitate polymer, the temperature dependence of loss modulus was compared. The temperature at which the vinyl palmitate polymer exhibited the sharp melt property was 38° C. The ref 1 had no sharp melt property, and the loss modulus of the ref 1 decreased gradually with the temperature. Styrene and vinyl palmitate have monomer reactivity ratios $r_1$ of 15 and $r_2$ of 0.01.

A phase separation structure of a styrene polymer and the vinyl palmitate homopolymer was examined as described below.

A styrene polymer and the vinyl palmitate polymer produced in the synthesis example 3 were dissolved in chloroform. Developing this solution with a large amount of methanol formed a precipitate. After the precipitate was dried under vacuum, the inner structure of the precipitate was examined. No phase separation structure was observed.

The styrene polymer was produced using the following procedures. 1.0 g of styrene and 8.0 g of toluene were weighed in a 20-mL glass vessel. The glass vessel equipped with a serum cap and a nitrogen inlet was placed in a thermostat at 80° C., and nitrogen bubbling was continued for 10 minutes. 0.25 g of V-601 dissolved in 2.2 g of toluene was then injected into the glass vessel to initiate radical polymerization. After six hours, the contents of the glass vessel were poured into a large amount of methanol, and a styrene polymer was collected as a precipitate.

Comparative Example 2

10.0 g of styrene and behenyl acrylate (compound 3) described in the synthesis example were weighed in a 20-mL glass vessel. The glass vessel equipped with a serum cap and a nitrogen inlet was placed in a thermostat at 80° C., and nitrogen bubbling was continued for 10 minutes. 0.4 g of V-601 dissolved in 0.4 g of toluene was then injected into the glass vessel to initiate radical copolymerization. After six hours, a solid body in the glass vessel was dried under vacuum to yield a resin composition ref 2.

The mass fraction of a unit derived from behenyl acrylate in the ref 2 was 40.2 mass % when calculated from $^1$H-NMR measurements.

The inner structure of the ref 2 was examined. No distinct phase separation structure was observed.

In the evaluation of brittleness, the ref 2 was rated good. In the evaluation of the resin viscoelasticity of the ref 2 and the behenyl acrylate polymer, the temperature dependence of loss modulus was compared. The temperature at which the behenyl acrylate polymer exhibited the sharp melt property was 63° C. The ref 2 had no sharp melt property, and the loss modulus of the ref 1 decreased gradually with the temperature. Styrene and behenyl acrylate have monomer reactivity ratios $r_1$ of 0.8 and $r_2$ of 0.3.

A phase separation structure of a styrene polymer and the behenyl acrylate homopolymer was examined as described below.

A styrene polymer and the behenyl acrylate homopolymer produced in the synthesis example 4 were dissolved in chloroform. Developing this solution with a large amount of methanol formed a precipitate. After the precipitate was dried under vacuum, the inner structure of the precipitate was examined. No phase separation structure was observed.

The styrene polymer was produced using the following procedures. 1.0 g of styrene and 10.0 g of toluene were weighed in a 20-mL glass vessel. The glass vessel equipped with a serum cap and a nitrogen inlet was placed in a thermostat at 80° C., and nitrogen bubbling was continued for 10 minutes. 0.04 g of V-601 dissolved in 0.2 g of toluene was then injected into the glass vessel to initiate radical polymerization. After six hours, the contents of the glass vessel were poured into a large amount of methanol, and a styrene polymer was collected as a precipitate.

The present invention can provide a method for producing a resin composition that has a sharp melt property and has toughness at room temperature in a single production process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-93537, filed Apr. 26, 2013 which is hereby incorporated by reference herein in its entirety.

What is claimed is:

1. A method for producing a resin composition, comprising the steps of:
   subjecting a radical copolymerization of
   a first radical polymerizable monomer which is free from any crystalline molecular chain, and a second radical polymerizable monomer having a crystalline molecular chain, in the presence of a radical polymerization initiator,
wherein the second radical polymerizable monomer is the following compound 1,

(compound 1)

(wherein $R_1$ denotes a hydrogen atom or a methyl group, and $R_2$ denotes an alkyl group having at least 17 carbon atoms), and
the first radical polymerizable monomer and the second radical polymerizable monomer are a combination of monomers such that a precipitate, which is obtained by a method shown below, has a sea-island type phase separation structure,
preparing a first homopolymer by polymerizing the first radical polymerizable monomer,
preparing a second homopolymer by polymerizing the second radical polymerizable monomer,
dissolving the first homopolymer and the second homopolymer in a solvent and obtaining a solution of the homopolymers, and
adding the solution of the homopolymers to a common poor solvent and obtaining the precipitate,
wherein the first radical polymerizable monomer has the following monomer reactivity ratio $r_1$, and the second radical polymerizable monomer has the following monomer reactivity ratio $r_2$, and $r_1 > 1.0$ $r_2 < 1.0$ (wherein $r_1 = k_{11}/k_{12}$,
wherein $k_{11}$ denotes a reaction rate constant of an addition reaction in which the first radical polymerizable monomer binds to the first radical polymerizable monomer, and
$k_{12}$ denotes a reaction rate constant of an addition reaction in which the second radical polymerizable monomer binds to the first radical polymerizable monomer, and
$r_2 = k_{22}/k_{21}$,
wherein $k_{22}$ denotes a reaction rate constant of an addition reaction in which the second radical polymerizable monomer binds to the second radical polymerizable monomer, and
$k_{21}$ denotes a reaction rate constant of an addition reaction in which the first radical polymerizable monomer binds to the second radical polymerizable monomer)

the ratio (B/(A+B)) of the second radical polymerizable monomer to the first radical polymerizable monomer is 0.25 or more and 0.80 or less in the copolymerization, wherein A denotes the amount of first radical polymerizable monomer (parts by mass), and B denotes the amount of second radical polymerizable monomer (parts by mass),
the resin composition comprises a first unit which is free from any crystalline molecular chain and a second unit having a crystalline molecular chain, wherein
the unit having a crystalline molecular chain is the following unit 1, (unit 1)

(wherein $R_1$ denotes a hydrogen atom or a methyl group, and $R_2$ denotes an alkyl group having at least 17 carbon atoms),
the ratio (D/(C+D)) of the second unit to the first unit is 0.25 or more and 0.80 or less in the resin composition, wherein C denotes the amount of first unit (parts by mass), and D denotes the amount of second unit (parts by mass), and
the resin composition has a sea-island type phase separation structure in which a main unit of a resin component forming the island phase is the first unit, and a main unit of a resin component forming the sea phase is the second unit.

2. The method for producing a resin composition according to claim 1, wherein $R_2$ in the compound 1 is a linear alkyl group.

3. The method for producing a resin composition according to claim 1, wherein the ratio (B/(A+B)) of the second radical polymerizable monomer to the first radical polymerizable monomer in the copolymerization is 0.30 or more and 0.60 or less.

4. The method for producing a resin composition according to claim 1, wherein the radical polymerization initiator includes two or more radical polymerization initiators having different 10-hour half-life temperatures that differ by 10° C. or more.

5. The method for producing a resin composition according to claim 1, wherein the first radical polymerizable monomer is a styrene.

* * * * *